US012409903B2

(12) United States Patent
Jeong

(10) Patent No.: US 12,409,903 B2
(45) Date of Patent: Sep. 9, 2025

(54) PART UNIT AND STRUCTURE FOR ASSEMBLING VEHICLE BODY

(71) Applicant: WOOBO TECH CO., LTD., Pyeongtaek-si (KR)

(72) Inventor: Hae Il Jeong, Incheon (KR)

(73) Assignee: WOOBO TECH CO., LTD., Pyeongtaek-si (KR)

(*) Notice: Subject to any disclaimer, the term of this patent is extended or adjusted under 35 U.S.C. 154(b) by 0 days.

(21) Appl. No.: 18/009,950

(22) PCT Filed: Jun. 15, 2022

(86) PCT No.: PCT/KR2022/008483
§ 371 (c)(1),
(2) Date: Dec. 12, 2022

(87) PCT Pub. No.: WO2023/158025
PCT Pub. Date: Aug. 24, 2023

(65) Prior Publication Data
US 2024/0199154 A1   Jun. 20, 2024

(30) Foreign Application Priority Data
Feb. 15, 2022  (KR) ........................ 10-2022-0019424

(51) Int. Cl.
*B62D 65/02*  (2006.01)
*F16B 5/02*   (2006.01)
(52) U.S. Cl.
CPC ............ *B62D 65/02* (2013.01); *F16B 5/0233* (2013.01)

(58) Field of Classification Search
CPC ...... B62D 65/02; B62D 65/024; B62D 65/16; B62D 27/023; B62D 27/065; F16B 19/1072; F16B 21/02; F16B 5/0208; F16B 5/0233
USPC .......................... 296/146.1, 152, 187.01, 29
See application file for complete search history.

(56) References Cited

U.S. PATENT DOCUMENTS

2020/0208661 A1* 7/2020 Wilke ................... F16B 5/0225
2022/0010598 A1* 1/2022 Jeong ..................... F16B 5/025

FOREIGN PATENT DOCUMENTS

| CN | 106438638 A | 2/2017 |
|---|---|---|
| CN | 106499272 A | 3/2017 |
| CN | 111406157 A | 7/2020 |
| KR | 20-1998-0033386 U | 9/1998 |
| KR | 19980033386 U | 9/1998 |
| KR | 20020022899 A | 3/2002 |
| KR | 20090103966 A | 10/2009 |
| KR | 10-0977084 B1 | 8/2010 |

(Continued)

OTHER PUBLICATIONS

International Searching Authority/KR, International Search Report and Written Opinion of the International Searching Authority, Application No. PCT/KR2022/008483, Oct. 21, 2021, 6 pages.

(Continued)

*Primary Examiner* — Dennis H Pedder
(74) *Attorney, Agent, or Firm* — Sunstein LLP

(57) ABSTRACT

A part unit and a vehicle body assembly structure are disclosed. In particular, a part unit and a vehicle body assembly structure with improved workability of assembling parts into a vehicle body of a curved surface are disclosed.

27 Claims, 16 Drawing Sheets

(56) References Cited

FOREIGN PATENT DOCUMENTS

| KR | 10-1809694 B1 | 1/2018 |
| KR | 10-2244641 B1 | 4/2021 |

OTHER PUBLICATIONS

China National Intellectual Propery Administration, Application No. 202280005051.6, dated Jul. 21, 2023, 9 pages (in Chinese).

\* cited by examiner

[Fig. 1]
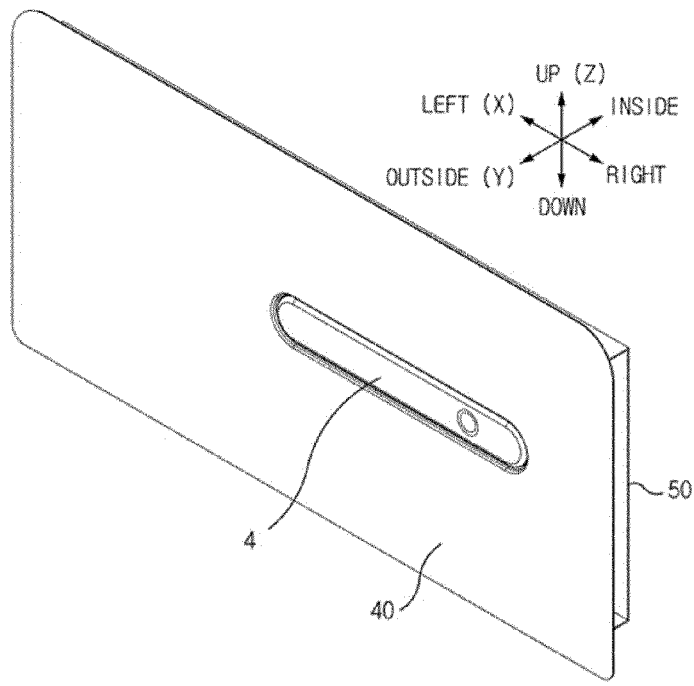
[Fig. 2]
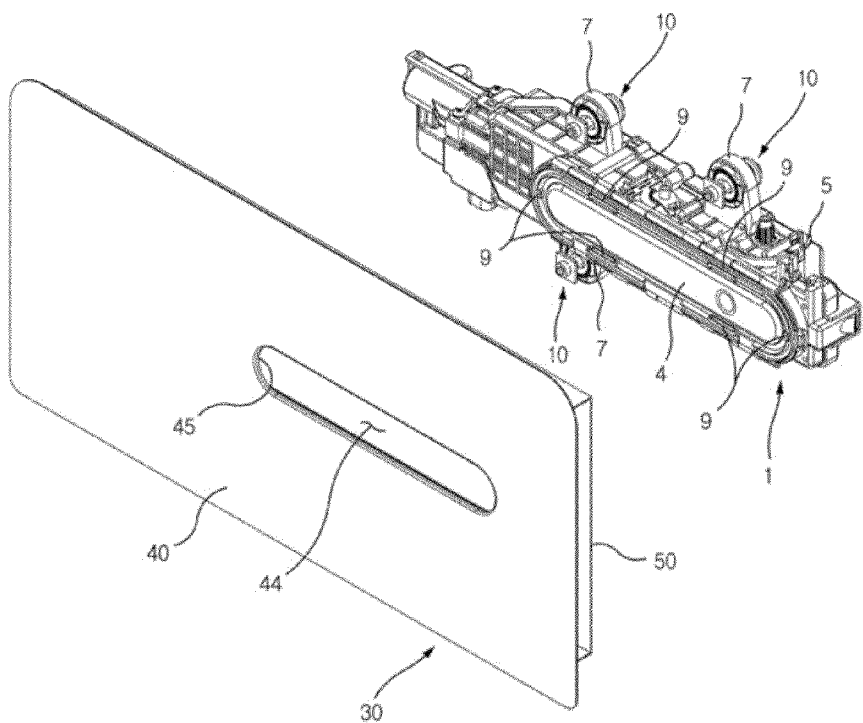

[Fig. 3]
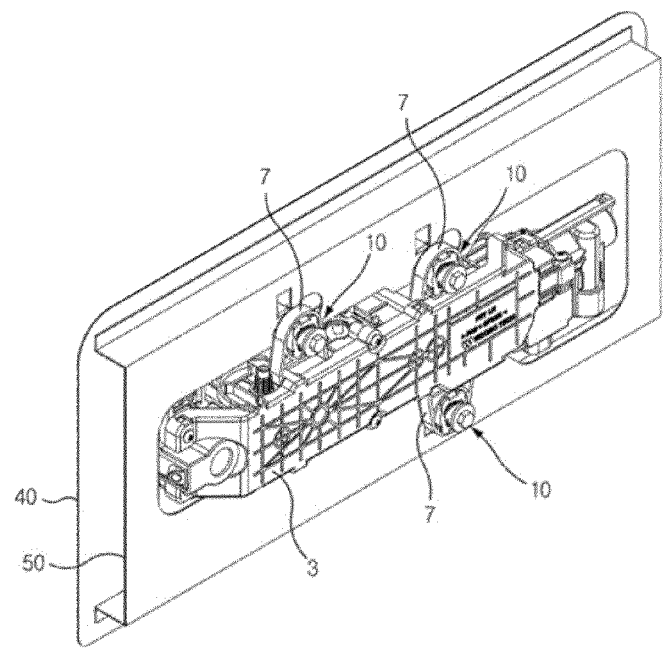
[Fig. 4]
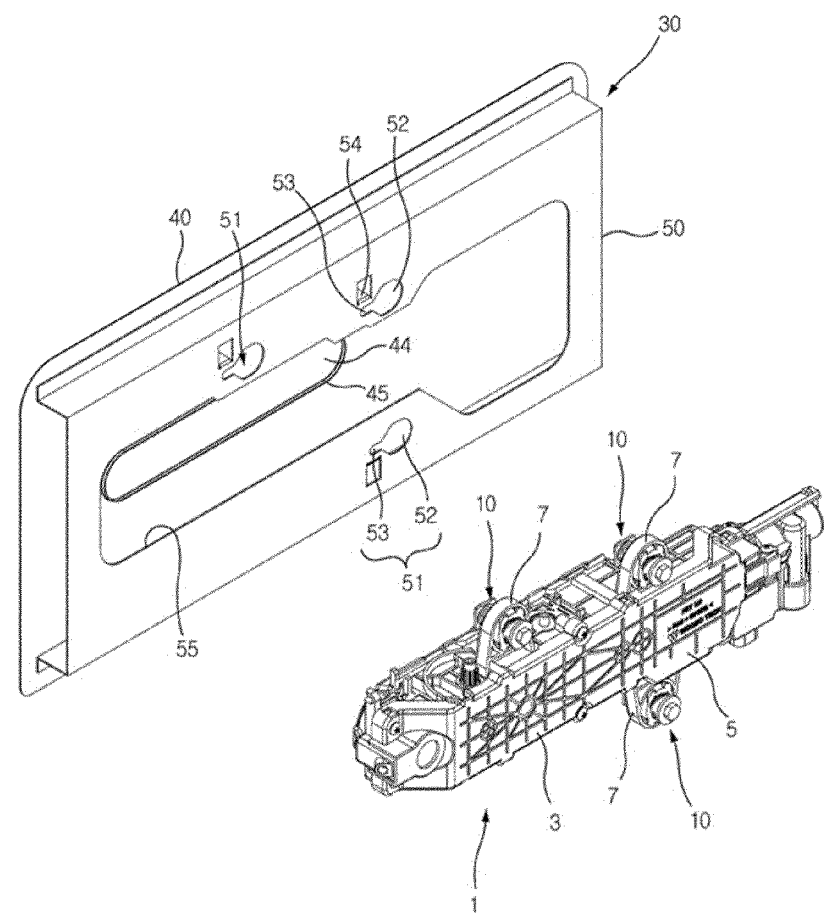

[Fig. 5]
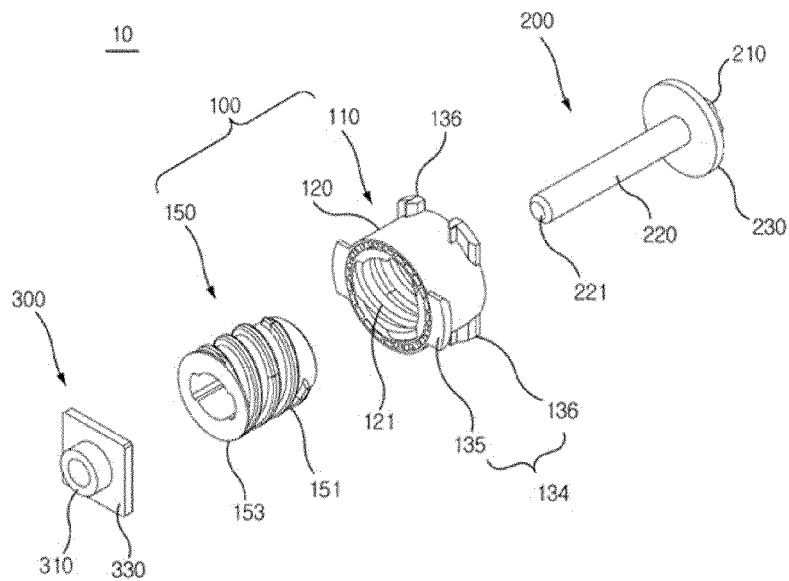
[Fig. 6]
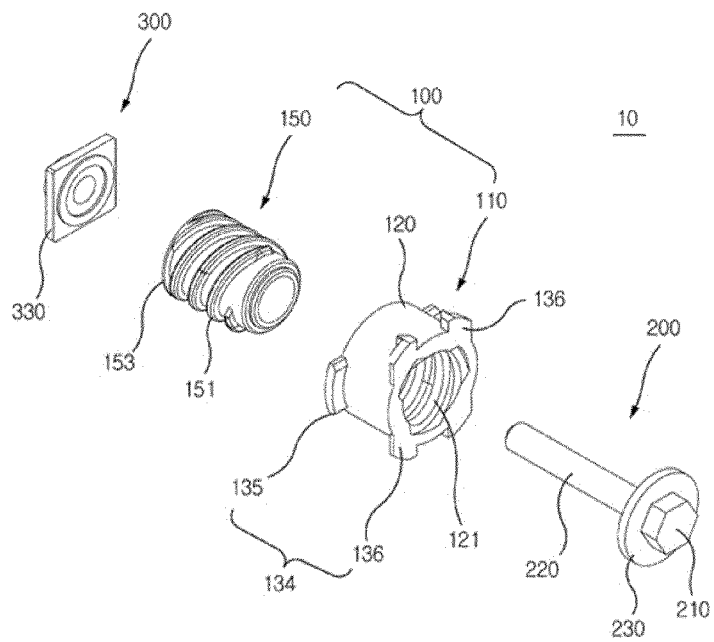

[Fig. 7]
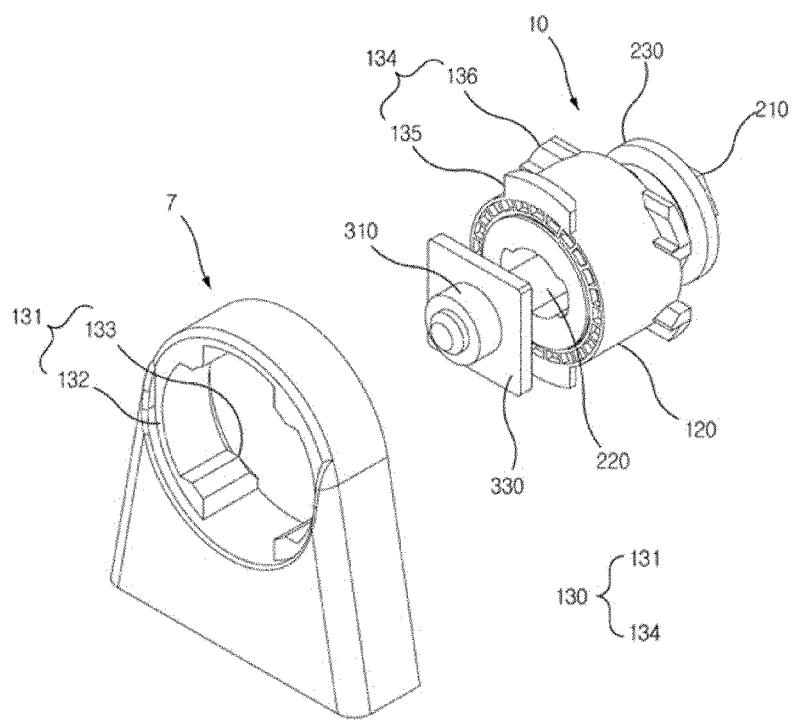
[Fig. 8]
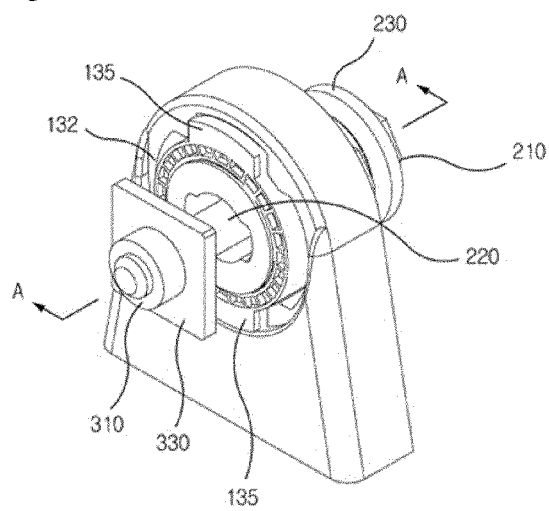

[Fig. 9]
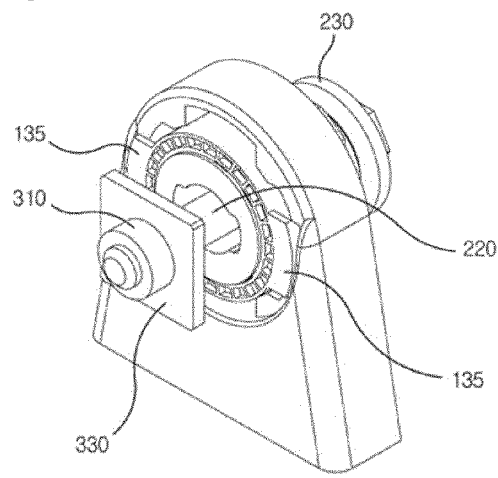
[Fig. 10]
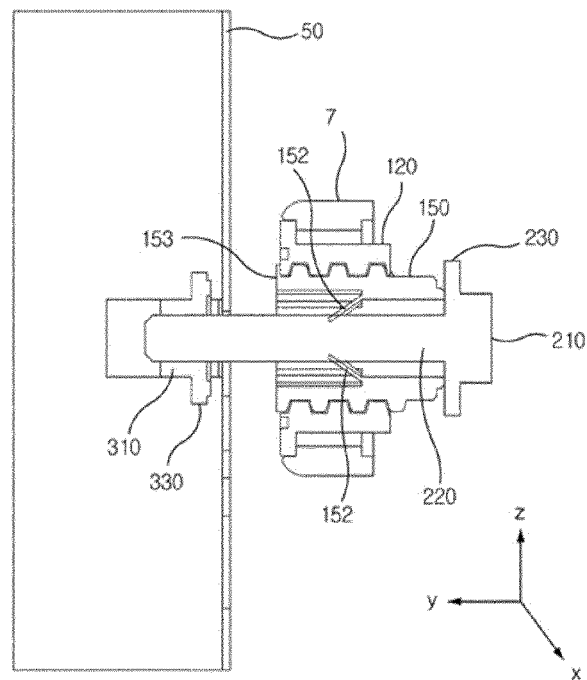

[Fig. 11]
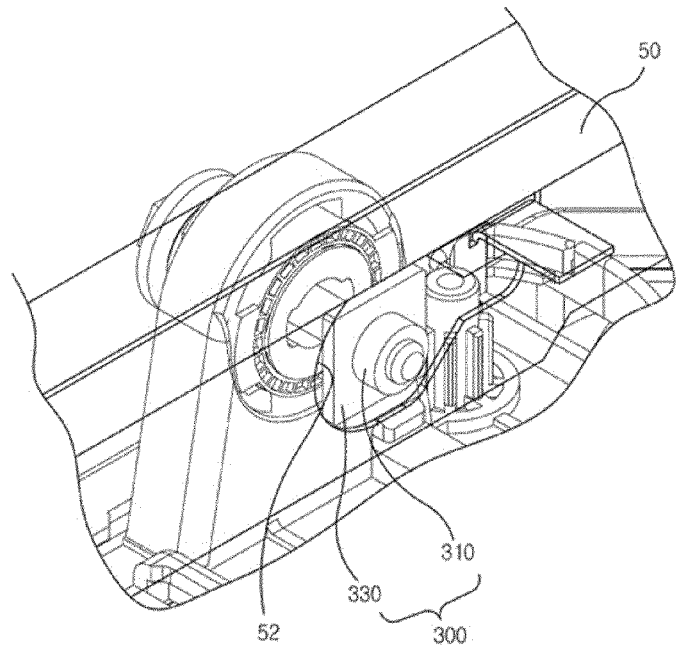
[Fig. 12]
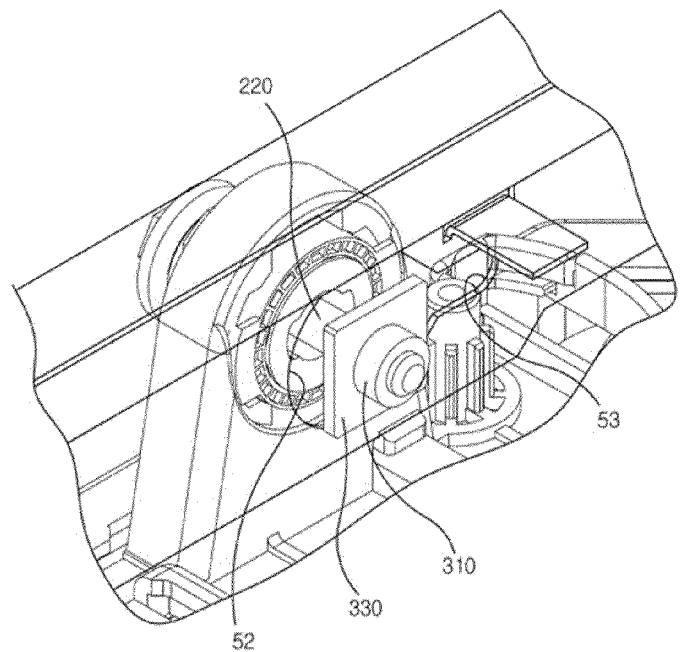

[Fig. 13]
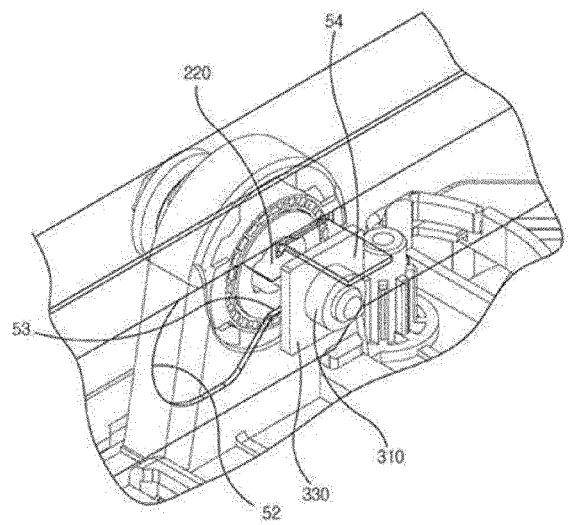
[Fig. 14]
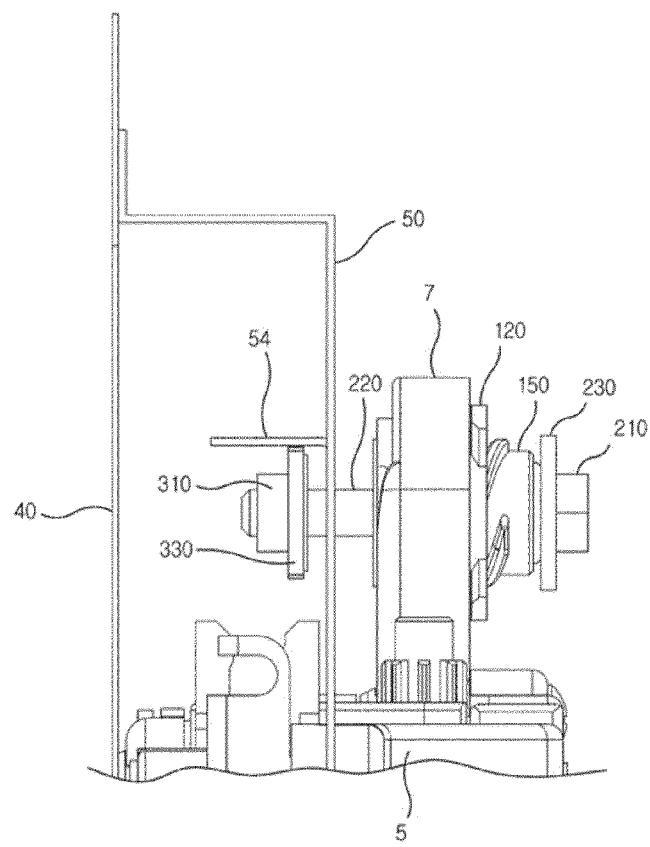

[Fig. 15]
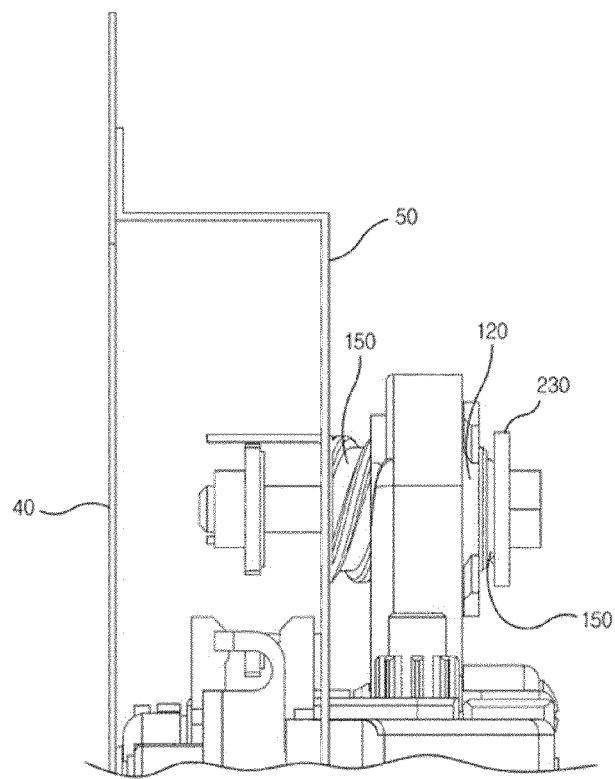
[Fig. 16]
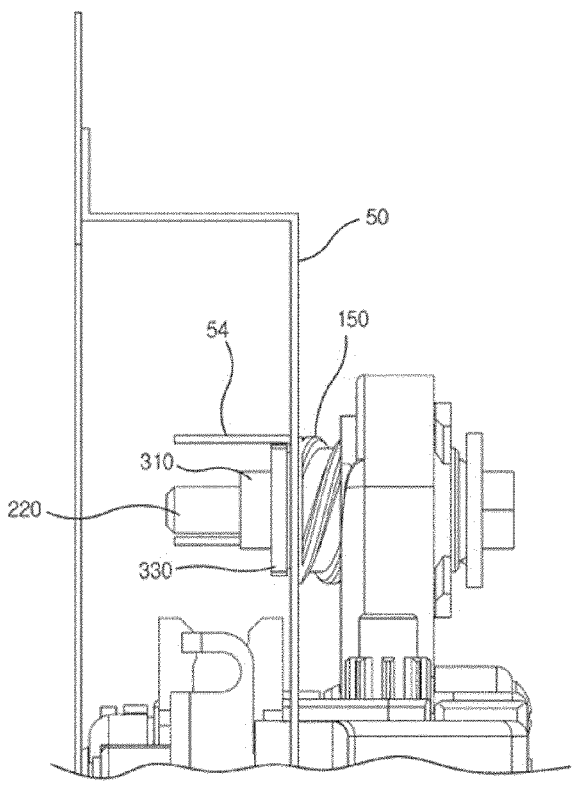

[Fig. 17]
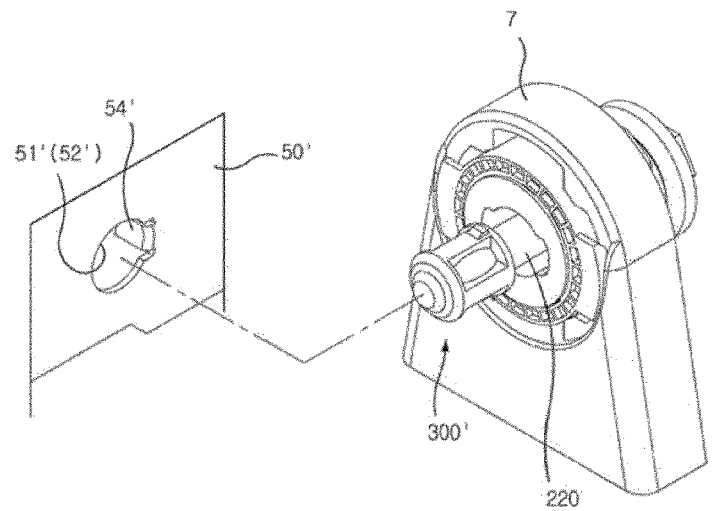
[Fig. 18]
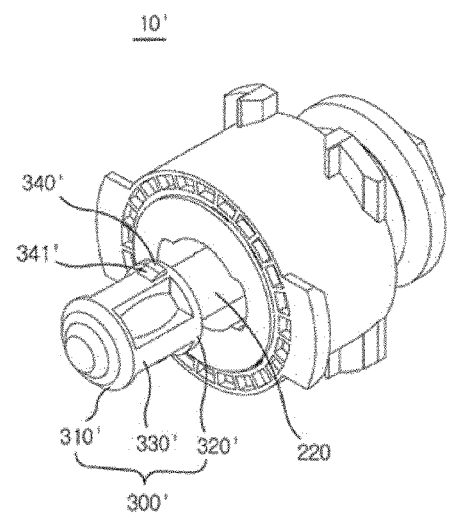
[Fig. 19]
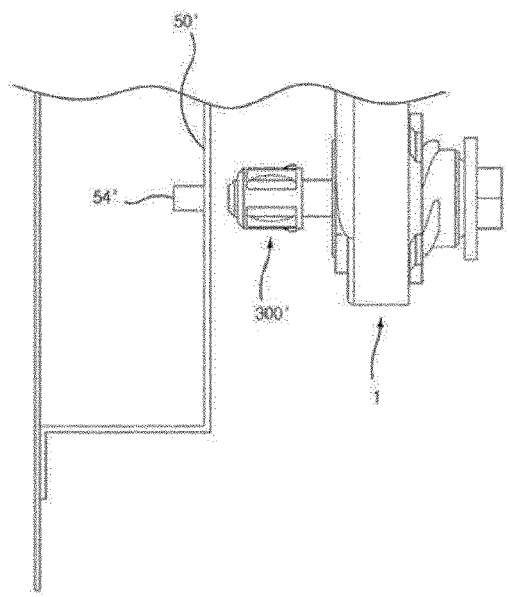

[Fig. 20]
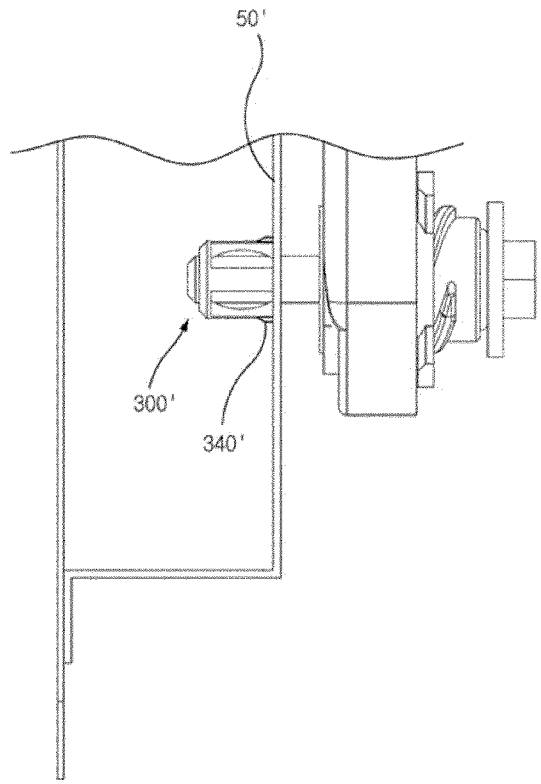
[Fig. 21]
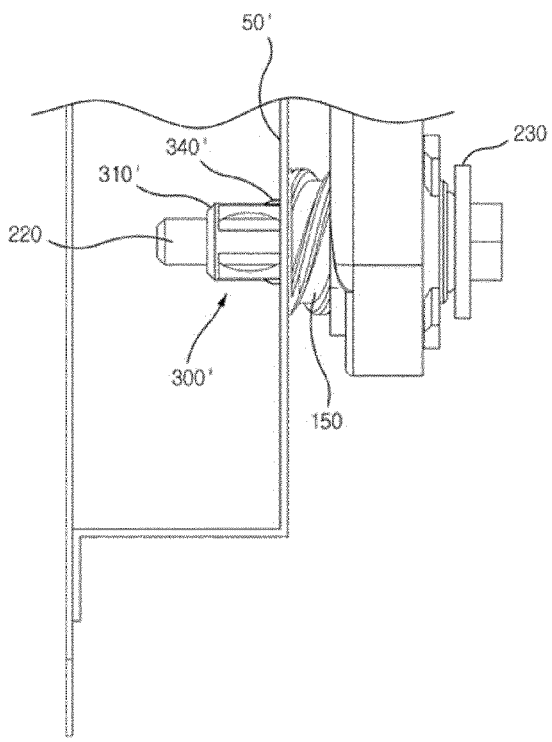

[Fig. 22]
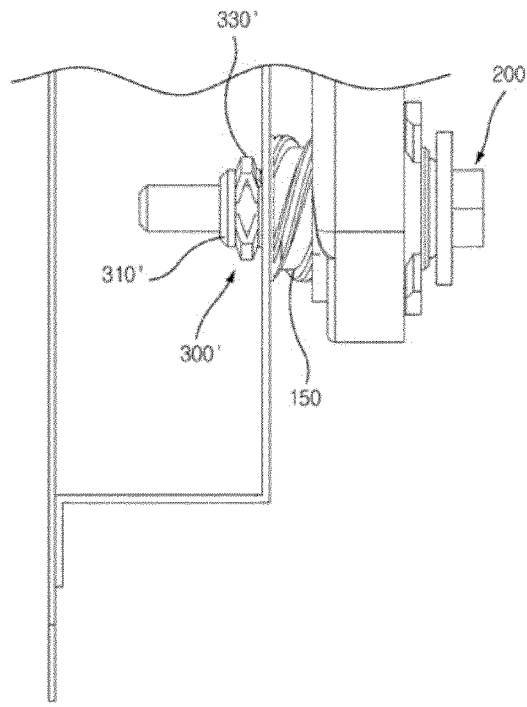
[Fig. 23]
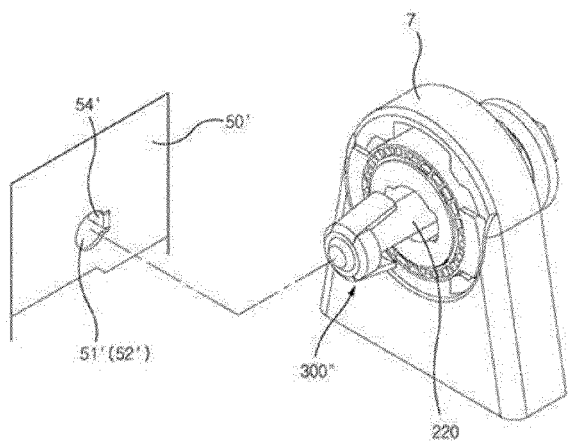

[Fig. 24]
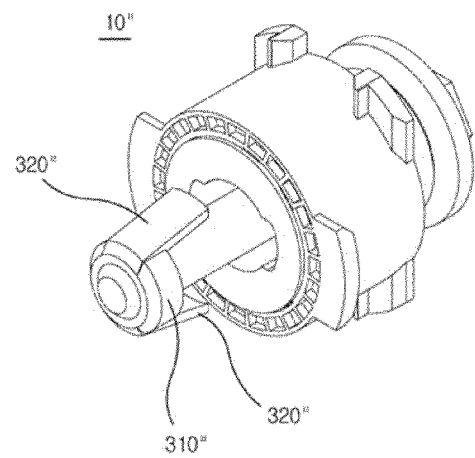
[Fig. 25]
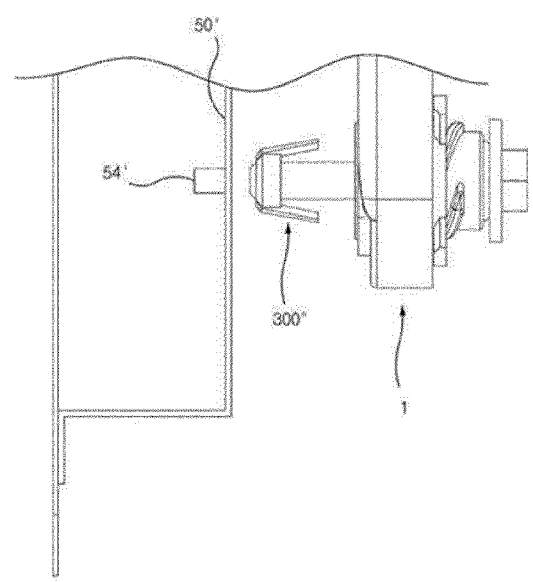

[Fig. 26]
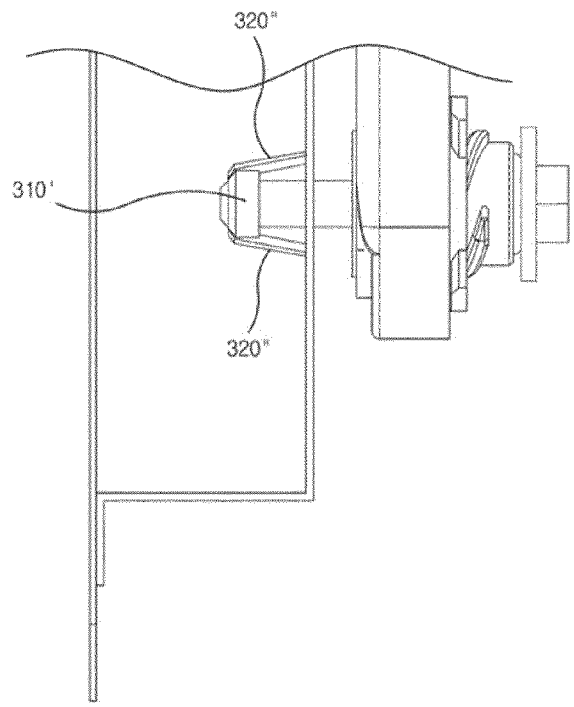
[Fig. 27]
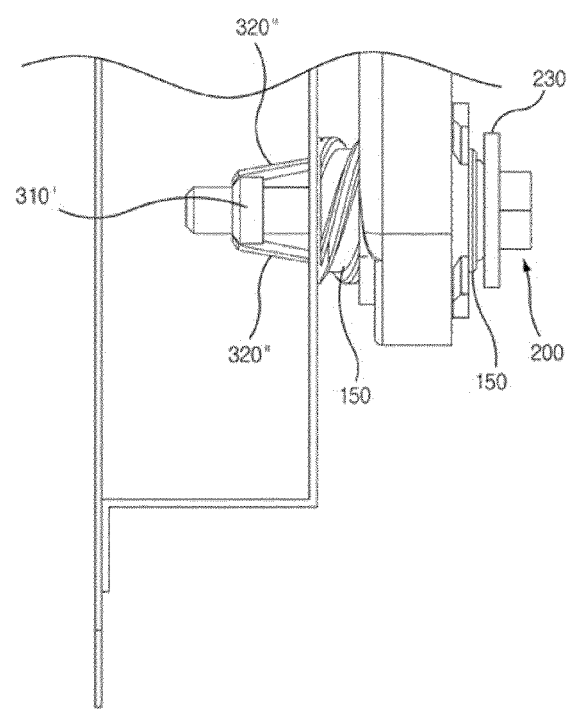

[Fig. 28]
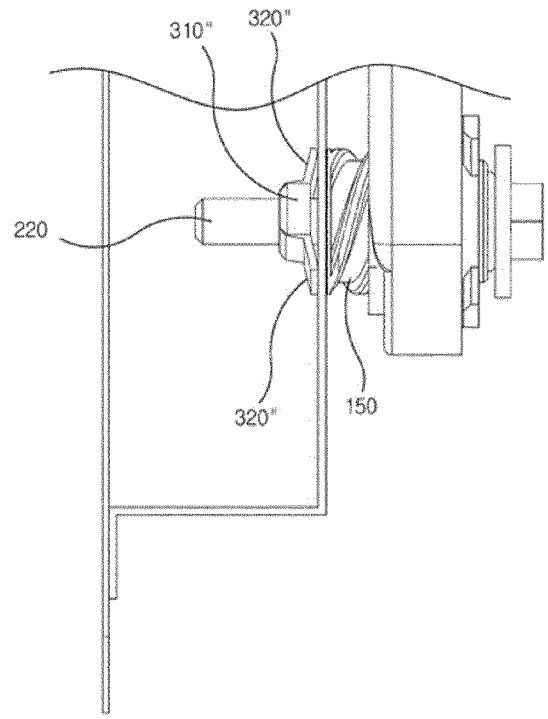
[Fig. 29]
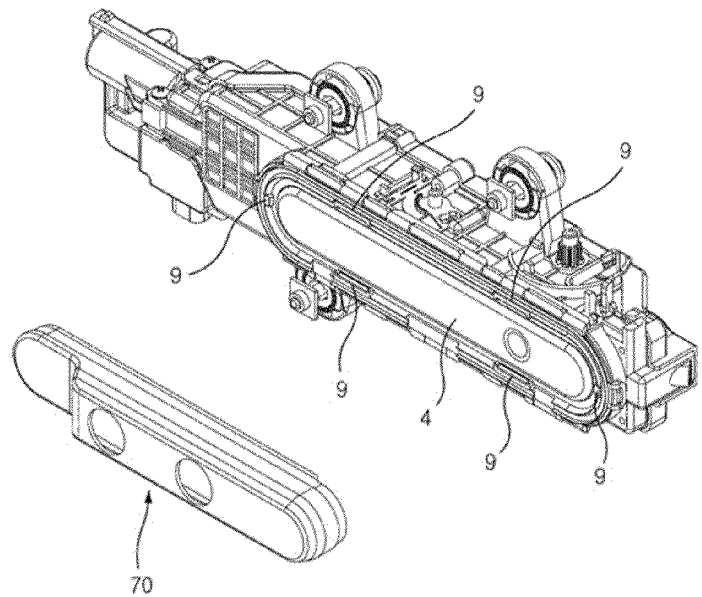

[Fig. 30]
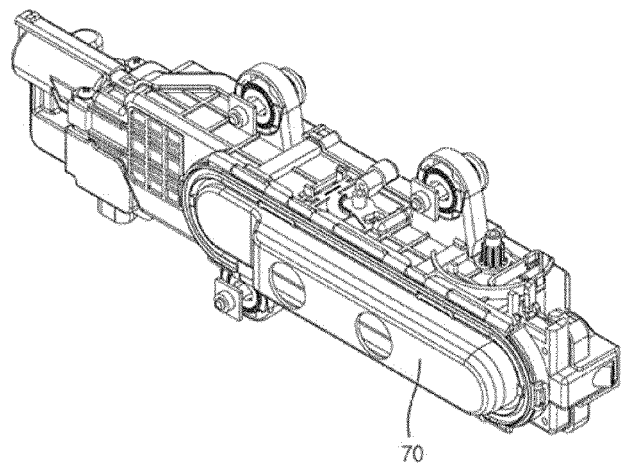
[Fig. 31]
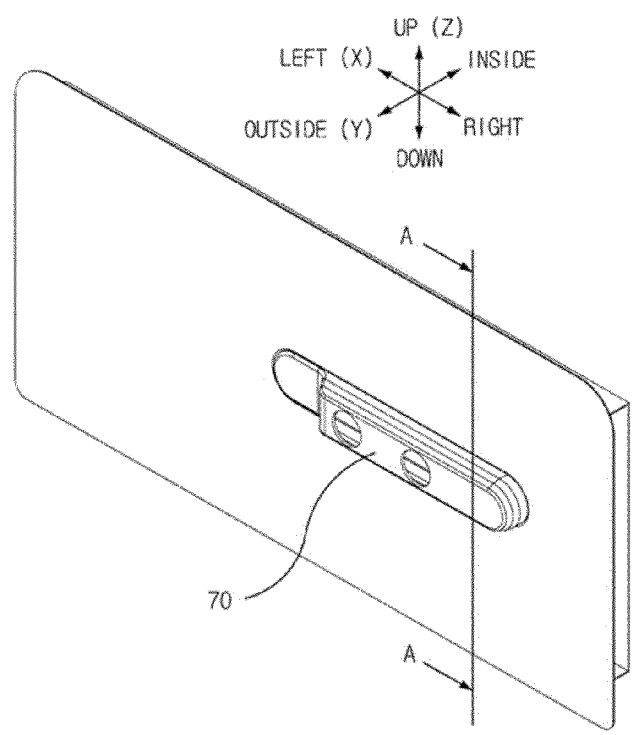

[Fig. 32]
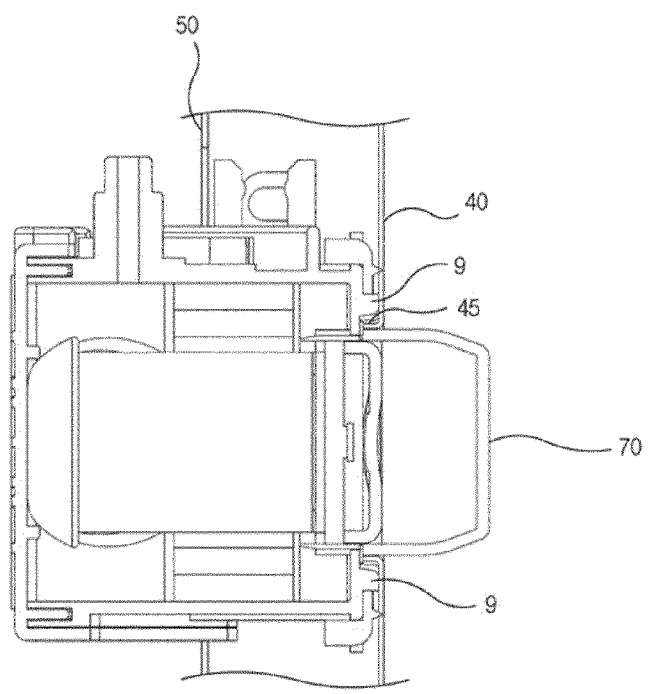
SECT A-A

PART UNIT AND STRUCTURE FOR ASSEMBLING VEHICLE BODY

This application is the national phase entry of international patent application no. PCT/KR2022/008483 filed Jun. 15, 2022 and claims the benefit of Korean patent application No. 10-2022-0019424, filed Feb. 15, 2022, the disclosures of which are incorporated herein by reference in their entirety.

TECHNICAL FIELD

The present disclosure relates to a part unit and a vehicle body assembly structure. In particular, the present disclosure relates to a part unit and a vehicle body assembly structure with improved workability of assembling parts into a vehicle body of a curved surface.

BACKGROUND ART

A related art vehicle body assembly structure manages an appropriate dimensional tolerance of a vehicle body and vehicle parts when the vehicle body and the vehicle parts are assembled with each other.

However, after fastening holes of the parts are inserted into a large number of bolts welded to a bracket serving as an inner plate of the vehicle body, a large number of nuts are fastened to the bolts with a tool.

Therefore, since after a worker holds the part with one hand and temporarily fastens the large number of nuts to the bolts one by one with the other hand, the worker holds the tool with the other hand and performs final tightening, the worker is inconvenient due to a large number of works.

Further, a process of welding the large number of bolts to the bracket has to be added separately.

In addition, it is difficult to manufacture the bracket, and it is necessary to fix a large number of brackets to an outer plate of the vehicle body one by one.

DISCLOSURE OF INVENTION

Technical Problem

An object of the present disclosure is to address the above-described and other problems.

Another object of the present disclosure is to provide a part unit in which a fastening module with an improved tolerance including a bolt part and a nut part is assembled on a mounting part of a part.

Another object of the present disclosure is to provide a simple vehicle body assembly structure in which a worker holds a part unit, in which a fastening module with an improved tolerance including a bolt part and a nut part is assembled on a mounting part of a part, with one hand and with the other hand and fastens and couples the part unit to a vehicle body by turning the bolt part with a tool with the other hand.

Solution to Problem

In order to achieve the above-described and other objects, in one aspect of the present disclosure, there is provided a part unit assembled to a vehicle body part comprising a part on which a plurality of mounting parts is formed; and a fastening module assembled to each of the plurality of mounting parts, wherein the fastening module includes a screw bushing part installed on the mounting part to be linearly movable back and forth; a bolt part fitted toward a front from a rear of the screw bushing part; and a nut part fastened to a male screw rod of the bolt part protruding forward, wherein the nut part passes from an inside to an outside of the vehicle body part, and then the nut part and the screw bushing part closely couple inner and outer surfaces of the vehicle body part by a pressurization rotation of the bolt part.

In order to achieve the above-described and other objects, in another aspect of the present disclosure, there is provided a vehicle body assembly structure in which a part unit is assembled to a vehicle body part, wherein the vehicle body part includes a vehicle body outer plate and a vehicle body inner plate, wherein the vehicle body inner plate includes an insertion part penetrated back and forth; and an anti-rotation piece formed on an outer surface of the vehicle body inner plate, wherein the part unit includes a part on which a plurality of mounting parts is formed; and a fastening module configured to fasten and couple the plurality of mounting parts to the vehicle body inner plate, wherein the fastening module includes a screw bushing part installed on the mounting part to be linearly movable back and forth; a bolt part fitted toward a front from a rear of the screw bushing part; and a nut part fastened to a male screw rod of the bolt part protruding forward, wherein the nut part is inserted into the insertion part and is disposed between the vehicle body outer plate and the vehicle body inner plate, and wherein the nut part and the screw bushing part closely couple inner and outer surfaces of the vehicle body inner plate by a rotation of the bolt part.

Advantageous Effects of Invention

Effects of a part unit and a vehicle body assembly structure according to the present disclosure are described as follows.

According to at least one embodiment of the present disclosure, the present disclosure can provide a part unit implementing a fastening module in which a bolt and a nut are installed.

According to at least one embodiment of the present disclosure, the present disclosure can provide a part unit with improved assemblability in which a fastening module is assembled to a part once.

According to at least one embodiment of the present disclosure, the present disclosure can provide a vehicle body assembly structure that can be expected to improve quality and reduce the cost by improving a process and the assembly workability of a part unit to a vehicle body.

Additional scope of applicability of the present disclosure will become apparent from the detailed description given blow. However, it should be understood that the detailed description and specific examples such as embodiments of the present disclosure are given merely by way of example, since various changes and modifications within the spirit and scope of the present disclosure will become apparent to those skilled in the art from the detailed description.

BRIEF DESCRIPTION OF DRAWINGS

FIGS. 1 and 2 are coupling and separation perspective views of a vehicle body assembly structure according to an embodiment of the present disclosure when viewed from the front.

FIGS. 3 and 4 are rear perspective views of FIGS. 1 and 2.

FIGS. 5 and 6 are front and rear perspective views dividedly illustrating a fastening module.

FIG. 7 is a perspective view before a fastening module is assembled to a mounting part of a part.

FIGS. 8 and 9 are perspective views illustrating that a fastening module is inserted into and rotation-coupled to a mounting part of a part.

FIG. 10 is a cross-sectional view taken along line A-A of FIG. 8.

FIGS. 11 to 16 illustrate order of assembling parts of FIG. 1 to a vehicle body.

FIG. 17 is a separation perspective view of a vehicle body assembly structure according to another embodiment of the present disclosure when viewed from the rear.

FIG. 18 is a perspective view illustrating a fastening module of FIG. 17.

FIGS. 19 to 22 illustrate order of assembling parts of FIG. 17 to a vehicle body.

FIG. 23 is a separation perspective view of a vehicle body assembly structure according to yet another embodiment of the present disclosure when viewed from the rear.

FIG. 24 is a perspective view illustrating a fastening module of FIG. 23.

FIGS. 25 to 28 illustrate order of assembling parts of FIG. 23 to a vehicle body.

FIGS. 29 and 30 are perspective views illustrating before and after a guide cover is assembled to a part.

FIG. 31 is a perspective view illustrating coupling parts of FIG. 30 to a vehicle body.

FIG. 32 is a cross-sectional view taken along line A-A of FIG. 31.

MODE FOR THE INVENTION

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the present disclosure, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the present disclosure is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected with other layers, areas, and components intervening between them. For example, when layers, areas, components, etc. are electrically connected, the present disclosure includes both the case where layers, areas, and components are directly electrically connected, and the case where layers, areas, and components are indirectly electrically connected with other layers, areas, and components intervening between them.

Hereinafter, an x-axis is defined as a left-right direction, y-axis is defined as an inside-outside direction or a front-rear direction, and a z-axis is defined as an up-down direction.

FIGS. 1 and 2 are coupling and separation perspective views of a vehicle body assembly structure according to an embodiment of the present disclosure when viewed from the front. FIGS. 3 and 4 are rear perspective views of FIGS. 1 and 2.

Referring to FIGS. 1 to 4, a vehicle body assembly structure according to an embodiment of the present disclosure may include a part unit 1.

The part unit 1 may be assembled to a vehicle body part 30.

The part unit 1 may include a part 3. The part 3 may be a flush door from which a grip is withdraw.

The part 3 may include a housing 5. The housing 5 may be formed by assembling front and rear housings. A grip 4 may be disposed on a front surface of the housing 5. An operating part (not shown) withdrawing the grip 4 may be mounted inside the housing 5.

The part 3 may include a mounting part 7. The mounting part 7 may be installed on upper and lower sides of the housing 5 or formed integrally. That is, the mounting part 7 may include two mounting parts at upper left and right sides and one mounting part at a lower side. Referring to FIG. 7, the mounting part 7 may have a ring shape having a through hole.

The part unit 1 may include a fastening module 10. The fastening module 10 may be assembled to the mounting part 7. The fastening module 10 may be coupled to a vehicle body.

FIGS. 5 and 6 are front and rear perspective views dividedly illustrating a fastening module.

Referring to FIGS. 5 and 6, the fastening module 10 may include a screw bushing part 100. The screw bushing part 100 may be installed on the mounting part 7 to be linearly movable back and forth.

The screw bushing part 100 may include a screw cover part 110. The screw cover part 110 may be installed on the mounting part 7. The screw cover part 110 can improve the assemblability of the fastening module 10 to the mounting part 7.

The screw cover part 110 may include a hollow cover 120. An inner screw 121 may be formed on an inner circumferential surface of the hollow cover 120.

The screw cover part 110 may include a detachable part 130. The detachable part 130 may detach the hollow cover 120 from the mounting part 7.

Referring to FIG. 7, the detachable part 130 may include a first detachable part 131. The first detachable part 131 may be formed on the mounting part 7.

The first detachable part 131 may include a first front catching inner jaw 132. The first front catching inner jaw 132 may be formed to protrude toward the center at the front left and right sides of the mounting part 7.

The first detachable part 131 may include a first rear catching inner jaw 133. The first rear catching inner jaw 133 may be formed on the rear side of the mounting part 7 in a diagonal direction. The first rear catching inner jaw 133 may be disposed on the upper and lower sides at the left and right sides when viewed from the front or rear.

Referring to FIGS. 5 and 6, the detachable part 130 may include a second detachable part 134. The second detachable part 134 may be formed in the hollow cover 120.

The second detachable part 134 may include a second front catching outer jaw 135. The second front catching outer jaw 135 may be formed to protrude toward the center at the front left and right sides of the hollow cover 120. The second front catching outer jaw 135 may pass between the first front catching inner jaw 132 and the first rear catching inner jaw 133 in the up-down direction. The second front catching outer jaw 135 may be caught on the first front catching inner jaw 132.

The second detachable part 134 may include a second rear catching outer jaw 136. The second rear catching outer jaw 136 may be formed on the rear side of the hollow cover 120 in the diagonal direction. The second rear catching outer jaw 136 may be disposed on the upper and lower sides at the left and right sides of the second front catching outer jaw 135.

Referring to FIGS. 8 and 9, when the hollow cover 120 is inserted and rotated into the mounting part 7, the second detachable part 134 may be detached from the first detachable part 131.

The detachable part 130 can simply assemble the fastening module 10 which is a pre-prepared tolerance module, and thus workability can be improved, and performance improvement such as quality and cost can be expected.

Referring to FIGS. 5 and 6, the screw bushing part 100 may include a screw bush 150. An outer screw 151 may be formed on an outer circumferential surface of the screw bush 150. The outer screw 151 of the screw bush 150 may be fastened to the inner screw 121 of the hollow cover 120. As the screw bush 150 rotates, the screw bush 150 may linearly move with respect to the hollow cover 120. The inner screw 121 of the hollow cover 120 and the outer screw 151 of the screw bush 150 may freely move linearly due to a large angle between them. The screw bush 150 may be fastened and inserted from the front to the rear of the hollow cover 120. The screw bush 150 may be provided with a catching jaw 153. The catching jaw 153 may be formed as a flange at a front surface of the screw bush 150. The catching jaw 153 may be caught on a front surface of the hollow cover 120.

Referring to FIG. 10, the screw bush 150 may include an one-direction slope catching jaw 152. The one-direction slope catching jaw 152 may be formed inside the screw bush 150. The one-direction slope catching jaws 152 may be formed to face each other at upper and lower sides. The one-direction slope catching jaw 152 may allow a front movement of a bolt part 200 and suppress a rear movement of the bolt part 200. The one-direction slope catching jaw 152 may protrude to be inclined downward as it goes from an inner circumferential surface to a front of the screw bush 150. A tip of the one-direction slope catching jaw 152 may have a concave arc shape. The concave arc shape is fitted to an outer circumferential surface of the bolt part 200 and can increase an anti-rear slip force.

The one-direction slope catching jaw 152 enables an anti-rear slip of the bolt part 200 (a bolt thread and the catching jaw act like a hook to easily move to the front and be caught on the rear), maintenance of the center origin between the screw bush 150 and the bolt part 200 (securing XZ reference point for convenient tool use), prevention of flow between the screw bush 150 and the bolt part 200 (improvement of noise-causing factors such as hitting sound), and tolerance compensation by adjusting the XZ direction, thereby providing a flexible structure.

Referring to FIGS. 5 and 6, the fastening module 10 may include the bolt part 200. The bolt part 200 may be fitted toward the front from the rear of the screw bush 150.

The bolt part 200 may include a washer based bolt 200. The washer based bolt 200 may include a hexagonal head 210, a male screw rod 220, and a head washer 230 formed on the hexagonal head 210. The hexagonal head 210 may be a tool application portion, the male screw rod 220 may be a fastening portion of a nut part 300, and the head washer 230 may be a rear end pressing portion of the screw bush 150. A tip 221 of the male screw rod 220 may be compressed after the fastening module 10 is assembled. The compression can prevent separation of the nut part 300 fastened to the male screw rod 220.

Referring to FIGS. 5 and 6, the fastening module 10 may include the nut part 300. Referring to FIGS. 7 to 10, the nut part 300 may be fastened to the male screw rod 220 protruding forward from the front surface of the hollow cover 120. Thus, the nut part 300 may pass from the inside to the outside of the vehicle body part 30, and then closely couple inner and outer surfaces of the vehicle body part 30 together with the hollow cover 120 by a pressurization rotation of the bolt part 200.

The nut part 300 may include a washer based nut 300. The washer based nut 300 may include a nut 310. The nut 310 may be fastened to the male screw rod 220. The washer based nut 300 may include a washer 330. The washer 330 may be integrally formed with the nut 310. The washer 330 may have an angled shape (polygonal shape). For example, the washer 330 may have a quadrilateral shape. The quadrilateral washer 330 is easily caught on the outer surface of the vehicle body part 30 and can prevent the nut 310 from idling.

The vehicle body assembly structure according to another embodiment of the present disclosure may include the vehicle body part 30.

Referring to FIG. 4, the vehicle body part 30 may include a vehicle body outer plate 40. The vehicle body outer plate 40 may be an outer plate with a curved surface. The vehicle body outer plate 40 may include a grip withdrawing hole 44. The grip 4 may be disposed inside the grip withdrawing hole 44. An inner horizontal bent piece 45 may be formed at an edge of the grip withdrawing hole 44. The inner horizontal bent piece 45 may be horizontally bent inward. A guide protrusion 9 may be fitted to the outside of the inner horizontal bent piece 45. Referring to FIG. 2, the six guide protrusions 9 may be formed on the front surface of the housing 5 along a perimeter of the grip 4. For example, the total of six guide protrusions 9 may include two upper, two lower, and left and right guide protrusions.

The vehicle body part 30 may include a vehicle body inner plate 50. The vehicle body inner plate 50 may be installed to be spaced apart from the vehicle body outer plate 40.

The vehicle body inner plate 50 may include an insertion part 51.

The insertion part 51 may include an insertion hole 52. The insertion hole 52 may be a hole that penetrates back and forth. The insertion hole 52 may have an enough size to insert the quadrilateral washer 330.

The insertion part 51 may include a slot 53. The slot 53 may have a key groove shape. The slot 53 may communicate with one side of the insertion hole 52. The slot 53 may be a movement path of the male screw rod 220. The inner plate 50 around the slot 53 may be caught and pressed by the quadrilateral washer 330.

The vehicle body inner plate 50 may include an anti-rotation piece 54. The anti-rotation piece 54 may be a plate bent 90 degrees after pressing the vehicle body inner plate 50 in a ⊏-shape. The anti-rotation piece 54 may be disposed on or below the slot 53. One side of the quadrilateral washer 330 may be adjacent to a lower surface of the anti-rotation piece 54. The anti-rotation piece 54 is caught by the quadrilateral washer 330 and thus can prevent idling of the nut 310.

The vehicle body inner plate 50 may include a part insertion hole 55. The front surface of the housing 5 of the part 3 may be inserted and disposed in the part insertion hole 55. In this case, the mounting part 7 may be disposed inside the vehicle body inner plate 50.

FIGS. 11 to 16 illustrate order of assembling the parts of FIG. 1 to the vehicle body.

More specifically, FIG. 11 illustrates before the nut part 300 of the part unit 1 is inserted into the insertion hole 52 of the vehicle body inner plate 50.

FIG. 12 illustrates after the nut part 300 of the part unit 1 is inserted into the insertion hole 52 of the vehicle body inner plate 50.

Referring to FIG. 13, when the nut part 300 is inserted into the insertion hole 52, the part 3 is disposed at a mounting position by moving the male screw rod 220 toward the slot 53.

Referring to FIG. 14, when the housing 5 is pushed forward and inserted after the part 3 moves and is disposed at the mounting position, as illustrated in FIG. 32, the 6-point guide protrusion 9 is placed outside the inner horizontal bent piece 45, and the grip 4 is precisely disposed in the grip withdrawing hole 44. Further, the front surface of the housing 5 is inserted into the part insertion hole 55, and a guide cover 70 is matched and inserted into an inner peripheral surface of the inner horizontal bent piece 45.

When the guide protrusion 9 is placed outside the inner horizontal bent piece 45, as illustrated in FIG. 15, the bolt part 200 and the screw bush 150 advance forward by a force of the tool pressing the bolt part 200, i.e., a force of the head washer 230 pressing a rear end of the screw bush 150. The screw bush 150 can freely move at a large screw angle to automatically compensate as much as a gap with the vehicle body inner plate 50.

Referring to FIG. 16, when the tool continues to operate and the bolt part 200 rotates in place in a state where the front surface of the screw bush 150 contacts an inner surface of the vehicle body inner plate 50, the nut part 300 does not rotate by the anti-rotation piece 54 and is retracted along the male screw rod 220. The quadrilateral washer 330 of the nut part 300 is pressed and coupled together with the screw bush 150 while being caught on an outer surface of the vehicle body inner plate 50. The screw bush 150 may serve as a chock between the bolt part 200 and the nut part 300.

FIG. 17 is a separation perspective view of a vehicle body assembly structure according to another embodiment of the present disclosure when viewed from the rear.

Referring to FIG. 17, a fastening module 10' and a vehicle body inner plate 50' according to another embodiment are similar to the fastening module 10 and the vehicle body inner plate 50 according to an embodiment. On the other hand, a nut part 300' of the fastening module 10' and an insertion part 51' of the vehicle body inner plate 50' are different from the nut part 300 of the fastening module 10 and the insertion part 51 of the vehicle body inner plate 50 in a shape and a function.

FIG. 18 is a perspective view illustrating the fastening module 10' of FIG. 17.

Referring to FIG. 18, the nut part 300' of the fastening module 10' may include a shape modification nut part 300'.

The shape modification nut part 300' may include a front ring 310' and a rear ring 320' fitted to a male screw rod 220. The shape modification nut part 300' may consist of a nut in which a female thread (not shown) is formed on an inner circumferential surface of the front ring 310'.

The shape modification nut part 300' may include a plurality of bridges 330'. The plurality of bridges 330' may have a band shape. The plurality of bridges 330' may connect the front ring 310' and the rear ring 320' along a circumference between the front ring 310' and the rear ring 320'. The bridge 330' may have a decreasing thickness as it goes toward the center between the front ring 310' and the rear ring 320'. That is, a lower surface of the bridge 330' may have an arch shape. The center of the bridge 330' is configured to have a thin thickness, and thus the bridges 330' can be folded well while the front ring 310' moves toward the rear ring 320'.

The shape modification nut part 300' may include an anti-slip protrusion 340'. The anti-slip protrusion 340' may be caught on an outer surface of the vehicle body inner plate 50'. The anti-slip protrusion 340' may include an inclined surface 341'. The inclined surface 341' may have a slope with an increasing inclination as it goes to the rear. The inclined surface 341' may provide a flexible insertion of the insertion part 51'. The anti-slip protrusion 340' may be formed on an outer surface of the rear ring 320' or a rear outer surface of the bridge 330'.

Referring to FIG. 17, the vehicle body inner plate 50' may include the insertion part 51'. The insertion part 51' may include an insertion hole 52'. The insertion hole 52' may have an enough size to insert the shape modification nut part 300'. A diameter of the insertion hole 52' may be less than an outer diameter of the anti-slip protrusion 340'. That is, the anti-slip protrusion 340' can be forcibly inserted into the insertion hole 52' by using the inclined surface 341' and elastic deformation.

FIGS. 19 to 22 illustrate order of assembling parts of FIG. 17 to a vehicle body.

More specifically, FIG. 19 illustrates before the shape modification nut part 300' of the part unit 1 is inserted into the insertion hole 52' of the vehicle body inner plate 50'.

FIG. 20 illustrates after the shape modification nut part 300' of the part unit 1 is inserted into the insertion hole 52' of the vehicle body inner plate 50'. That is, when the shape modification nut part 300' is inserted into the insertion hole 52' of the vehicle body inner plate 50', a rear surface of the anti-slip protrusion 340' is caught on the outer surface of the vehicle body inner plate 50' to the extent that it does not slip.

When the shape modification nut part 300' is inserted into the insertion hole 52', as illustrated in FIG. 32, the 6-point guide protrusion 9 is placed outside the inner horizontal bent piece 45, and the grip 4 is precisely disposed in the grip withdrawing hole 44. Further, the front surface of the housing 5 is inserted into the part insertion hole 55, and the guide cover 70 is matched and inserted into the inner peripheral surface of the inner horizontal bent piece 45.

When the guide protrusion 9 is placed outside the inner horizontal bent piece 45, as illustrated in FIG. 21, the bolt part 200 and the screw bush 150 advance forward by a force of the tool pressing the bolt part 200, i.e., a force of the head washer 230 pressing the rear end of the screw bush 150. The screw bush 150 can freely move at a large screw angle to automatically compensate as much as a gap with the vehicle body inner plate 50'.

Referring to FIG. 22, when the tool continues to operate and the bolt part 200 rotates in place in a state where the anti-slip protrusion 340' of the shape modification nut part 300' is caught on the outer surface of the vehicle body inner plate 50' and does not rotate by an anti-rotation piece 54' in a state where the front surface of the screw bush 150 contacts an inner surface of the vehicle body inner plate 50', the front ring 310' is retracted along the male screw rod 220. Hence, as the center of the bridge 330' is folded and spread, it is pressed and coupled together with the screw bush 150 while being caught on the outer surface of the vehicle body inner plate 50'. The screw bush 150 may serve as a chock between the bolt part 200 and the shape modification nut part 300'.

FIG. 23 is a separation perspective view of a vehicle body assembly structure according to yet another embodiment of the present disclosure when viewed from the rear.

Referring to FIG. 23, a fastening module 10" according to yet another embodiment is similar to the fastening module 10' according to another embodiment, but a nut part 300" of the fastening module 10" is different from the nut part 300' of the fastening module 10' in a shape and a function.

FIG. 24 is a perspective view illustrating the fastening module 10" of FIG. 23.

Referring to FIG. 24, the nut part 300" of the fastening module 10" may include a shape modification nut part 300".

The shape modification nut part 300" may include a nut 310". The nut 310" may have a ring shape. The nut 310" may be fastened to a male screw rod 220.

The shape modification nut part 300" may include a plurality of inclined wings 320". The inclined wing 320" may protrude to be upward inclined as it goes toward the rear from the nut 310". That is, the inclined wing 320" may be a wedge type. The inclined wing 320" may have a shape that can be well bent and spread. An outer diameter of a tip of the inclined wing 320" may be much greater than an inner diameter of an insertion hole 52'.

FIGS. 25 to 28 illustrate order of assembling parts of FIG. 23 to a vehicle body.

More specifically, FIG. 25 illustrates before the shape modification nut part 300" of the part unit 1 is inserted into an insertion hole 52' of a vehicle body inner plate 50'.

FIG. 26 illustrates after the shape modification nut part 300" of the part unit 1 is inserted into the insertion hole 52' of the vehicle body inner plate 50'. That is, when the shape modification nut part 300" is inserted into the insertion hole 52' of the vehicle body inner plate 50', the inclined wing 320" is caught on an outer surface of the vehicle body inner plate 50' while the inclined wing 320" is elastically deformed downward and then is restored.

When the shape modification nut part 300" is inserted into the insertion hole 52', as illustrated in FIG. 32, the 6-point guide protrusion 9 is placed outside the inner horizontal bent piece 45, and the grip 4 is precisely disposed in the grip withdrawing hole 44. Further, the front surface of the housing 5 is inserted into the part insertion hole 55, and the guide cover 70 is matched and inserted into the inner peripheral surface of the inner horizontal bent piece 45.

When the guide protrusion 9 is placed outside the inner horizontal bent piece 45, as illustrated in FIG. 27, the bolt part 200 and the screw bush 150 advance forward by a force of the tool pressing the bolt part 200, i.e., a force of the head washer 230 pressing the rear end of the screw bush 150. The screw bush 150 can freely move at a large screw angle to automatically compensate as much as a gap with the vehicle body inner plate 50'.

Referring to FIG. 28, when the tool continues to operate in a state where the inclined wing 320" of the shape modification nut part 300" is caught on the outer surface of the vehicle body inner plate 50' and does not rotate by an anti-rotation piece 54' in a state where the front surface of the screw bush 150 contacts the inner surface of the vehicle body inner plate 50', the bolt part 200 rotates in place, and the nut 310" is retracted along the male screw rod 220. Hence, as the inclined wing 320" is folded and spread, the inclined wing 320" is pressed and coupled together with the screw bush 150 while being caught on the outer surface of the vehicle body inner plate 50'. The screw bush 150 may serve as a chock between the bolt part 200 and the shape modification nut part 300".

FIGS. 29 and 30 are perspective views illustrating before and after a guide cover is assembled to a part. FIG. 31 is a perspective view illustrating coupling parts of FIG. 30 to a vehicle body.

Referring to FIGS. 29 and 30, the vehicle body assembly structure according to an embodiment of the present disclosure may include the guide cover 70. The guide cover 70 may cover a grip 4 of a flush handle. The guide cover 70 may be matched to the grip withdrawing hole 44. A front surface of the guide cover 70 may protrude outward from the grip withdrawing hole 44.

The guide cover 70 can secure skin consistency. That is, (1) Due to characteristics of the flush handle, it is important to secure the design consistency between the vehicle body outer plate 40 and the grip 4 on the outside of the vehicle (match of skin surface/match of gap without leaning of the product).

(2) Precisely seated in the grip withdrawing hole 44 using the 6-point guide protrusion 9 and a double guide structure capable of additionally securing a correct position.

(3) Complete by stably fastening the fastening modules 10, 10', and 10" with a tolerance structure in a state of being double guided by the 6-point guide protrusion 9 and the guide cover 70, and then removing the guide cover 70 (a detachable jig of the guide cover is recyclable).

Some embodiments or other embodiments of the present disclosure described above are not mutually exclusive or distinct from each other. Configurations or functions of some embodiments or other embodiments of the present disclosure described above can be used together or combined with each other.

It is obvious to those skilled in the art that the present disclosure can be embodied in other specific forms without departing from the spirit and essential features of the present disclosure. Accordingly, the above detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

What is claimed is:

1. A part unit assembled to a vehicle body part, comprising:
    a part on which a plurality of mounting parts is formed; and
    a fastening module assembled to each of the plurality of mounting parts,
    wherein the fastening module includes:
    a screw bushing part installed on the mounting part to be linearly movable back and forth;
    a bolt part fitted toward a front from a rear of the screw bushing part; and
    a nut part fastened to a male screw rod of the bolt part protruding forward,
    wherein the nut part passes from an inside to an outside of the vehicle body part, and then the nut part and the screw bushing part closely couple inner and outer surfaces of the vehicle body part by a pressurization rotation of the bolt part,
    wherein the screw bushing part includes:
    a screw cover part installed on the mounting part; and
    a screw bush screw-fastened to the screw cover part,
    wherein the screw bush linearly moves forward by the pressurization rotation of the bolt part.

2. The part unit of claim 1, wherein the nut part includes washer based nut.

3. The part unit of claim 1, wherein the screw cover part includes:
    a hollow cover in which a screw is formed on an inner circumferential surface of the hollow cover; and
    a detachable part configured to detach the hollow cover from the mounting part.

4. The part unit of claim 3, wherein the detachable part includes:
    a first detachable part formed on the mounting part; and
    a second detachable part formed on the hollow cover,
    wherein when the hollow cover is inserted and rotated into the mounting part, the second detachable part is detached from the first detachable part.

5. The part unit of claim 4, wherein the first detachable part includes:
    a first front catching inner jaw formed at front left and right sides of the mounting part; and
    a first rear catching inner jaw formed at a diagonal rear of the mounting part,
    wherein the second detachable part includes:
    a second front catching outer jaw formed at front left and right sides of the hollow cover; and
    a second rear catching outer jaw formed at a diagonal rear of the hollow cover,
    wherein the second front catching outer jaw is caught on the first front catching inner jaw, and
    wherein the second rear catching outer jaw is caught on the first rear catching inner jaw.

6. The part unit of claim 1, wherein facing one-direction slope catching jaws are formed inside the screw bush, and
    wherein the one-direction slope catching jaws allow a front movement of the bolt part and suppress a rear movement of the bolt part.

7. The part unit of claim 6, wherein the one-direction slope catching jaws protrude to be inclined downward as they go from an inner circumferential surface to a front of the screw bush.

8. The part unit of claim 1, wherein the bolt part includes a washer based bolt.

9. A vehicle body assembly structure in which a part unit is assembled to a vehicle body part,
    wherein the vehicle body part includes a vehicle body outer plate and a vehicle body inner plate,
    wherein the vehicle body inner plate includes:
    an insertion part penetrated back and forth; and
    an anti-rotation piece formed on an outer surface of the vehicle body inner plate,
    wherein the part unit includes:
    a part on which a plurality of mounting parts is formed; and
    a fastening module configured to fasten and couple the plurality of mounting parts to the vehicle body inner plate,
    wherein the fastening module includes:
    a screw bushing part installed on the mounting part to be linearly movable back and forth;
    a bolt part fitted toward a front from a rear of the screw bushing part; and
    a nut part fastened to a male screw rod of the bolt part protruding forward,
    wherein the nut part is inserted into the insertion part and is disposed between the vehicle body outer plate and the vehicle body inner plate, and
    wherein the nut part and the screw bushing part closely couple inner and outer surfaces of the vehicle body inner plate by a rotation of the bolt part.

10. The vehicle body assembly structure of claim 9, wherein the insertion part includes:
    an insertion hole through which the nut part passes; and
    a slot configured to communicate with the insertion hole,
    wherein the slot is formed as a movement path of the male screw rod of the bolt part,
    wherein the nut part includes an angled washer based nut,
    wherein one side of the angled washer based nut is caught on the anti-rotation piece, and
    wherein one surface of the angled washer based nut is caught on the outer surface of the vehicle body inner plate and is pressed.

11. The vehicle body assembly structure of claim 9, wherein the screw bushing part includes:
    a screw cover part installed on the mounting part; and
    a screw bush screw-fastened to the screw cover part.

12. The vehicle body assembly structure of claim 11, wherein the screw cover part includes:
    a hollow cover in which a screw is formed on an inner circumferential surface of the hollow cover; and
    a detachable part configured to detach the hollow cover from the mounting part.

13. The vehicle body assembly structure of claim 12, wherein the detachable part includes:
    a first detachable part formed on the mounting part; and a second detachable part formed on the hollow cover,
wherein when the hollow cover is inserted and rotated into the mounting part, the second detachable part is detached from the first detachable part.

14. The vehicle body assembly structure of claim 13, wherein the first detachable part includes:
a first front catching inner jaw formed at front left and right sides of the mounting part; and
a first rear catching inner jaw formed at a diagonal rear of the mounting part,
wherein the second detachable part includes:
a second front catching outer jaw formed at front left and right sides of the hollow cover; and
a second rear catching outer jaw formed at a diagonal rear of the hollow cover,
wherein the second front catching outer jaw is caught on the first front catching inner jaw, and
wherein the second rear catching outer jaw is caught on the first rear catching inner jaw.

15. The vehicle body assembly structure of claim 12, wherein facing one-direction slope catching jaws are formed inside the screw bush, and
wherein the one-direction slope catching jaws allow a front movement of the bolt part and suppress a rear movement of the bolt part.

16. The vehicle body assembly structure of claim 9, wherein the part includes a flush handle with a grip that is withdrawn,
wherein a part insertion hole, in which a front side of the part is inserted and disposed, is formed in the vehicle body inner plate, and
wherein a grip withdrawing hole, from which the grip is withdrawn, is formed in the vehicle body outer plate.

17. The vehicle body assembly structure of claim 16, wherein an inner horizontal bent piece, that is horizontally bent inward, is formed at an edge of the grip withdrawing hole, and
wherein a guide protrusion fitted to an outside of the inner horizontal bent piece is formed on a front surface of the part.

18. The vehicle body assembly structure of claim 17, wherein a guide cover is detachably installed between the guide protrusion and the grip, and
wherein the guide cover is matched to the grip withdrawing hole and is inserted into and protrudes from the grip withdrawing hole.

19. The vehicle body assembly structure of claim 9, wherein the bolt part includes a washer based bolt.

20. The part unit of claim 1, wherein the nut part includes a shape modification nut part.

21. The part unit of claim 20, wherein the shape modification nut part includes:
a front ring and a rear ring fitted to the male screw rod;
a plurality of bridges configured to connect the front ring and the rear ring;
a female thread formed on an inner circumferential surface of the front ring; and
an anti-slip protrusion formed at a rear of the bridges or an outer surface of the rear ring,
wherein the bridges are folded and widely spread while the front ring moves toward the rear ring.

22. The part unit of claim 21, wherein each of the plurality of bridges has a decreasing thickness as it goes toward a center between the front ring and the rear ring.

23. The part unit of claim 20, wherein the shape modification nut part includes:
a nut fastened to the male screw rod; and
a plurality of inclined wings protruding to be upward inclined as they go toward a rear from the nut,
wherein the inclined wings are bent and widely spread while the nut moves toward the vehicle body part.

24. The vehicle body assembly structure of claim 9, wherein the nut part includes a shape modification nut part, and
wherein the insertion part an insertion hole through which the shape modification nut part passes.

25. The vehicle body assembly structure of claim 24, wherein the shape modification nut part includes:
a front ring and a rear ring fitted to the male screw rod;
a plurality of bridges configured to connect the front ring and the rear ring;
a female thread formed on an inner circumferential surface of the front ring; and
an anti-slip protrusion formed on an outer surface of the rear ring,
wherein a side surface of the anti-slip protrusion is caught on the anti-rotation piece,
wherein a rear surface of the anti-slip protrusion is caught on the outer surface of the vehicle body inner plate, and
wherein the bridges are folded, widely spread, caught on the outer surface of the vehicle body inner plate, and pressed while the front ring moves toward the rear ring.

26. The vehicle body assembly structure of claim 25, wherein each of the plurality of bridges has a decreasing thickness as it goes toward a center between the front ring and the rear ring.

27. The vehicle body assembly structure of claim 24, wherein the shape modification nut part includes:
a nut fastened to the male screw rod; and
a plurality of inclined wings protruding to be upward inclined as they go toward a rear from the nut,
wherein the plurality of inclined wings is bent, widely spread, and pressed while the nut moves toward the outer surface of the vehicle body inner plate with the plurality of inclined wings being caught on the outer surface of the vehicle body inner plate.

* * * * *